United States Patent
Rittermeier et al.

(10) Patent No.: US 11,389,791 B2
(45) Date of Patent: Jul. 19, 2022

(54) METHOD FOR REGENERATING A TOXIFIED CATALYST CONTAINING RUTHENIUM OR RUTHENIUM COMPOUNDS

(71) Applicant: Covestro Deutschland AG, Leverkusen (DE)

(72) Inventors: Andre Rittermeier, Bochum (DE); Michael Venz, Dormagen (DE); Thomas Burbach, Bedburg (DE); Timm Schmidt, Neuss (DE); Tim Loddenkemper, Dormagen (DE); Frank Gerhartz, Leverkusen (DE); Walther Müller, Pulheim (DE)

(73) Assignee: COVESTRO DEUTSCHLAND AG, Leverkusen (DE)

( * ) Notice: Subject to any disclaimer, the term of this patent is extended or adjusted under 35 U.S.C. 154(b) by 238 days.

(21) Appl. No.: 16/614,062

(22) PCT Filed: May 14, 2018

(86) PCT No.: PCT/EP2018/062417
§ 371 (c)(1),
(2) Date: Nov. 15, 2019

(87) PCT Pub. No.: WO2018/210770
PCT Pub. Date: Nov. 22, 2018

(65) Prior Publication Data
US 2021/0154657 A1 May 27, 2021

(30) Foreign Application Priority Data
May 19, 2017 (EP) .................................. 17172042

(51) Int. Cl.
*B01J 38/42* (2006.01)
*B01J 27/10* (2006.01)
*B01J 38/14* (2006.01)

(52) U.S. Cl.
CPC ............... *B01J 38/42* (2013.01); *B01J 27/10* (2013.01); *B01J 38/14* (2013.01)

(58) Field of Classification Search
CPC ... B01J 38/42; B01J 27/10; B01J 38/14; B01J 23/46; B01J 23/462; B01J 38/06

USPC .......................................................... 502/35
See application file for complete search history.

(56) References Cited

U.S. PATENT DOCUMENTS

| 3,634,292 A * | 1/1972 | Hayes ....................... B01J 38/44 |
| | | 502/37 |
| 4,851,380 A | 7/1989 | Van Leirsburg et al. |
| 7,247,592 B2 | 7/2007 | Echigo et al. |
| 7,318,915 B2 | 1/2008 | Jordan et al. |
| 8,889,578 B2 | 11/2014 | Schmidt et al. |
| 9,610,567 B2 | 4/2017 | Henze et al. |
| 2007/0292336 A1 | 12/2007 | Wolf et al. |
| 2010/0303710 A1 | 12/2010 | Mori et al. |

FOREIGN PATENT DOCUMENTS

| DE | 1567788 A1 | 5/1970 |
| DE | 102006024543 A1 | 11/2007 |
| DE | 102008015406 A1 | 9/2009 |
| EP | 743277 A1 | 11/1996 |
| EP | 1867631 A1 | 12/2007 |
| GB | 744049 A | 2/1956 |
| GB | 1046313 A | 10/1966 |
| GB | 1278119 A | 6/1972 |
| WO | WO-2005075345 A1 | 8/2005 |
| WO | WO-2007066810 A1 | 6/2007 |
| WO | WO-2009118095 A2 | 10/2009 |
| WO | WO-2010076296 A1 | 7/2010 |

OTHER PUBLICATIONS

International Search Report for PCT/EP2018/062417 dated Jul. 4, 2018.
Written Opinion of the International Searching Authority for PCT/EP2018/062417 dated Jul. 4, 2018.

\* cited by examiner

*Primary Examiner* — Edward M Johnson
(74) *Attorney, Agent, or Firm* — Faegre Drinker Biddle & Reath LLP

(57) ABSTRACT

A process for regenerating a catalyst containing ruthenium or ruthenium compounds, which includes, optionally at elevated temperature, subjecting the catalyst to a hydrogen halide treatment, particularly a gas stream comprising hydrogen chloride, under non-oxidative conditions and, optionally at reduced temperature, to at least a two-stage oxidative post-treatment. The catalyst may have been poisoned by sulfur compounds. After the removal of sulfur, the catalyst is subjected to an oxidative post-treatment.

19 Claims, No Drawings

METHOD FOR REGENERATING A TOXIFIED CATALYST CONTAINING RUTHENIUM OR RUTHENIUM COMPOUNDS

CROSS-REFERENCE TO RELATED APPLICATIONS

This application is a national stage application (under 35 U.S.C. § 371) of PCT/EP2018/062417, filed May 14, 2018, which claims benefit of European Application No. 17172042.8, filed May 19, 2017, both of which are incorporated herein by reference in their entirety.

The reaction of catalysts comprising ruthenium or ruthenium compounds with sulfur compounds in many typical applications results in an irreversible reduction in activity which, according to conventional opinion, is due to poisoning. The present invention relates to a process with which the sulfur content of a catalyst comprising ruthenium or ruthenium compounds poisoned with sulfur in the form of sulfur compounds can be reduced by a specific treatment with a stream comprising hydrogen chloride under non-oxidative conditions to the extent that its activity increases to the activity of a similar catalyst which has not been poisoned with sulfur in the form of sulfur compounds. In addition, after the removal of sulfur, the catalyst is subjected to an oxidative post-treatment. The success of this regeneration is demonstrated using the example of catalytic oxidation of hydrogen chloride with oxygen and the oxidation of carbon monoxide with oxygen.

A typical field of application for a catalyst comprising ruthenium or ruthenium compounds is the production of chlorine by gas phase oxidation of hydrogen chloride with oxygen:

$$4\ HCl + O_2 \Rightarrow 2Cl_2 + 2H_2O$$

This reaction is an equilibrium reaction. The equilibrium position shifts with increasing temperature to disfavor the desired end product. It is therefore advantageous to use catalysts with maximum activity which allow the reaction to proceed at a low temperature.

Initial catalysts for hydrogen chloride oxidation comprised copper chloride or oxide as active component and were described by Deacon back in 1868. However, these had only low activity at low temperature (<400° C.). Although by increasing the reaction temperature their activity could be increased, the disadvantage was that the volatility of the active components resulted in a rapid deactivation.

Since up to the 60s in the 20th century, despite immense research activities in this field, no substantial advances could be achieved, the Deacon process designated according to the discoverer was pushed into the background by chloralkali electrolysis. Up to the 90s, virtually all chlorine was produced by electrolysis of aqueous sodium chloride solutions [Ullmann Encyclopedia of industrial chemistry, seventh release, 2006]. However, since the global demand for chlorine is currently growing faster than the demand for aqueous sodium hydroxide solution, the attractiveness of the Deacon process has not changed, since, as a result, hydrogen chloride can be reused for the production of chlorine, which is obtained in large amounts as coproduct in the phosgenation of amines for example.

A substantial advance in the field of hydrogen chloride oxidation was achieved by the discovery of ruthenium and ruthenium compounds as catalytically active components, which was described for the first time in 1965 in DE 1567788. Particularly due to the provision of a suitable support, major advances have been made since then. Supports which appear particularly suitable include titanium dioxide, the use of which is described in the application EP 743277 A1 for example, and tin dioxide, the use of which is evident from the application DE 10 2006 024 543 A1 for example.

Further typical fields of application for catalysts comprising ruthenium or ruthenium compounds are the (selective) oxidation of carbon monoxide and exhaust air purification. U.S. Pat. No. 7,247,592 B2 describes a catalyst comprising ruthenium or ruthenium compounds for the selective oxidation of carbon monoxide. The use of catalysts comprising ruthenium or ruthenium compounds is known from U.S. Pat. No. 7,318,915 B2 for combined use in the field of exhaust air purification. In this case, the catalyst described oxidizes carbon monoxide and volatile hydrocarbons, while at the same time nitrous gases are reduced.

A multiplicity of further applications for catalysts comprising ruthenium or ruthenium compounds is also known. Particularly in the synthesis of organic raw materials from crude oil fractions, natural gas or coal, catalysts comprising ruthenium or ruthenium compounds often take on a key role.

A major problem with the use of catalysts comprising ruthenium or ruthenium compounds is evidently their sensitivity to poisoning with sulfur. A sulfur contaminant in the input stream may be imposed, for example, by raw materials (e.g. crude oil fractions, natural gas, coal) comprising sulfur or upstream processes (e.g. drying gas with sulfuric acid, sulfur-containing activated carbon). It is known, for example, from WO 2007 066 810 A1 that it is of critical importance for the service life of a catalyst comprising ruthenium or ruthenium compounds for hydrogen chloride oxidation to reduce the sulfur contamination in the input stream to below 2 ppm. Diverse oxides are described in this application for reducing sulfur contamination on which sulfur components are reactively separated out. A disadvantage of this process is that volatile chlorides of these elements can be entrained on the catalyst or a peak loading of the sulfur contamination may lead to breakthrough of sulfur compounds.

Methods for regenerating catalysts comprising ruthenium or ruthenium compounds poisoned with sulfur in the form of sulfur compounds have already been described but are afflicted by many disadvantages. It is known from GB 744 049 A that catalysts comprising ruthenium or ruthenium compounds poisoned with sulfur in the form of sulfur compounds can be regenerated by washing. Examples of washing liquids include water, ethanol, acetic acid, cyclohexene, benzene and acetone. However, washing always harbors the risk that some of the active components are discharged with the washing liquid. This can happen both by physicochemical processes (e.g. reaction+absorption, solubility) and by mechanical processes (e.g. abrasion). In addition, the catalyst as a general rule must be removed for washing from the reactor used for the target reaction.

GB 1 278 119 A describes the regeneration of a catalyst comprising ruthenium or ruthenium compounds, poisoned by sulfur in the form of sulfur compounds, by a reducing treatment with an anhydrous hydrogen stream at 430 to 595° C., a pressure between 3 and 24 bar and some further oxidation and reduction steps. Such a combination of reducing conditions and high temperatures will result in a substantial reduction of ruthenium oxides (if previously present) to metallic ruthenium in deeper layers. By means of this treatment, the catalyst comprising ruthenium or ruthenium compounds will be subjected to drastic modifications which are possibly undesirable for some applications. For this application, pressure-resistant reactors, pipelines and fittings must also be provided, which is why the catalyst for this treatment as a general rule must be removed.

U.S. Pat. No. 4,851,380 A describes a process for regenerating carbon- and sulfur-contaminated monofunctional, large-pored zeolite reforming catalysts. In this case, a platinum catalyst is firstly subjected to an agglomeration procedure in oxygen-containing gas at 900-1200° F. and then an oxychlorination treatment at 800-1200° F. The application describes that this procedure can be applied to all elements of transition group VIII, preferably platinum, rhodium, ruthenium, iridium or osmium. Both the agglomeration procedure and the treatment at temperatures above 800° F. may result in drastic modifications and damage to catalysts comprising ruthenium or ruthenium compounds, which are undesirable for some industrial applications.

WO 2009 118 095 A3 describes a process with which the sulfur content of a catalyst comprising ruthenium or ruthenium compounds, poisoned with sulfur in the form of sulfur compounds, can be reduced by a specific treatment with a stream comprising hydrogen chloride under nonoxidative conditions to the extent that its activity increases to the activity of a similar catalyst which has not been poisoned with sulfur in the form of sulfur compounds. However, after this treatment, the catalyst comprising ruthenium or ruthenium compounds is present chlorinated or surface-chlorinated in the form of a chlorinated or oxychlorinated ruthenium compound or surface-chlorinated or oxychlorinated ruthenium compound. This can have the effect that on restarting the catalyst under reaction conditions, ruthenium escapes the catalyst bed in the form of volatile ruthenium compounds, which has a long-term negative effect on the performance of the catalyst.

WO 2010 076 2% A1 describes a process for regenerating a ruthenium oxide comprising hydrogen chloride oxidation catalyst on a support material, comprising the steps of a) reducing the catalyst with a gas stream comprising hydrogen chloride and optionally an inert gas at a temperature of 100 to 800° C., b) recalcining the catalyst with a gas stream comprising oxygen at a temperature of 150 to 800° C.

By means of recalcining the catalyst in step b), the chlorinated or surface-chlorinated ruthenium oxide catalyst in step a) is reoxidized, which prevents or at least reduces the formation of volatile ruthenium compounds on restarting the catalyst under reaction conditions. However, due to the abrupt recalcination in step b), i.e. the abrupt addition of oxygen, there is an abrupt reoxidation of the chlorinated ruthenium oxide catalyst. Since the oxidation of metals is an exothermic process, the abrupt heat of oxidation generated results in a high local increase in temperature, which in turn leads to sintering of the ruthenium oxide, i.e. to a reduction of the active surface of the catalyst and thus to long-term reduction of the performance of the catalyst.

Accordingly, no process has yet been developed with which the regeneration of a catalyst comprising ruthenium or ruthenium compounds, poisoned with sulfur in the form of sulfur compounds, is possible under mild conditions, which can increase the long-term activity of the catalyst to the activity of a similar catalyst which has not been poisoned with sulfur in the form of sulfur compounds. The processes known to date all harbor the risk of a partial loss of ruthenium or an undesirable modification of the catalyst structure. Accordingly, a gradual poisoning of a catalyst comprising ruthenium or ruthenium compounds by sulfur in the form of sulfur compounds is still a limiting factor in many processes in terms of service life. An abrupt, irreversible loss of activity by an unwanted peak in the sulfur contamination (e.g. due to transient start-up processes) represents a worst case scenario. Both factors harbor an enormous economic risk, since the recovery of ruthenium from a spent catalyst is laborious and a partial loss of ruthenium must be factored in.

The object of this invention is therefore to provide a long-term effective, mild and simple process for regenerating a catalyst comprising ruthenium or ruthenium compounds poisoned with sulfur in the form of sulfur compounds.

Surprisingly, it has been found that the sulfur content of a catalyst comprising ruthenium or ruthenium compounds poisoned with sulfur in the form of sulfur compounds can be reduced by a specific treatment with a hydrogen halide, especially a gas stream comprising hydrogen chloride, under non-oxidative conditions optionally at elevated temperature, to the extent that its activity increases to the activity of a similar catalyst which has not been poisoned with sulfur in the form of sulfur compounds.

It has also been found that a subsequent gentle oxidative post-treatment, in particular consisting of a first process step, which by treating with a gas stream comprising steam results in a gentle partial oxidation of the catalyst and in addition the sulfur compounds which are produced after the specific treatment with a gas stream comprising a hydrogen halide, especially hydrogen chloride, are removed from the reactor and the following pipelines and apparatuses, and a second process step, which consists of a specific treatment with a stream comprising oxygen, the concentration of which is preferably increased sequentially, carefully fully oxidizing the catalyst, as far as possible, which results in long-term successful regeneration.

The invention relates to a process for regenerating a catalyst comprising ruthenium or ruthenium compounds, which has been poisoned by sulfur in the form of sulfur compounds, characterized in that the catalyst, optionally at elevated temperature, is subjected to treatment with a hydrogen halide, particularly a gas stream comprising hydrogen chloride, under non-oxidative conditions and additionally, optionally at reduced temperature, to an at least two-stage oxidative post-treatment, wherein in a first process step the catalyst is partially oxidized by treatment with a gas stream comprising steam and in a second process step the catalyst is further oxidized, preferably fully oxidized, by treatment with a gas stream comprising oxygen, the oxygen concentration of which is preferably increased sequentially.

In the context of the invention, partially oxidized is understood to mean at least 1% oxidation of the catalyst. In the context of the invention, further oxidized is understood to mean a degree of oxidation above the oxidation of the catalyst of the first oxidative regeneration stage. In the context of the invention, fully oxidized is understood to mean particularly 100% oxidation of the catalyst.

In the following paragraphs, the phrase "regeneration of a catalyst comprising ruthenium or ruthenium compounds poisoned with sulfur" is also abbreviated to catalyst regeneration, regeneration or described with similar phrases. The use according to the invention can be applied to the regeneration of catalysts both based on ruthenium metal and on ruthenium compounds. Preferred ruthenium compounds are ruthenium halides, especially ruthenium chlorides, ruthenium oxide halides, especially ruthenium oxide chlorides, or ruthenium oxides, which may be present individually or in a mixture. In this context, for regenerating the ruthenium compounds comprising chlorine, hydrogen chloride is preferably used for the regeneration.

In the context of the invention, a catalyst is considered as poisoned if its activity, measured in terms of conversion by the catalyst (operational catalyst) comprising ruthenium or ruthenium compounds poisoned with sulfur in the form of sulfur compounds, is reduced in terms of a differential conversion range of the catalyzed reaction (conversion<=10%) by in particular at least 5%, preferably by at least 10%, particularly preferably by at least 20%. In a possible preferred embodiment for determination of the loss of activity, a small sidestream is separated off from the main stream to be supplied and is passed over a separate catalyst bed with the same catalyst material, in which a differential conversion is achieved by suitable choice of the contact time. In a possible preferred embodiment, a small portion of the catalyst (operational catalyst) comprising ruthenium or ruthenium compounds used is withdrawn from the reactor, transferred to a separate catalyst bed and the loss of activity in the differential conversion range is determined by means of a model reaction by suitable choice of the contact time.

Sulfur compounds which can poison (deactivate) catalysts comprising ruthenium or ruthenium compounds are preferably one or more compounds selected from the series: $H_2SO_4$, $H_2SO_3$, $SO_3$, $SO_2$, $SOCl_2$, $SCl_2$, $S_2Cl_2$, $CS_2$, $COS$, $H_2S$, and salts of $H_2SO_4$ and $H_2S_3$. By means of the reaction with the catalyst surface, these sulfur compounds are preferably converted under oxidative conditions to sulfur oxides, which are incorporated into the catalyst surface preferably via bridging oxygen or sulfur-metal bonds. Under reducing conditions, the sulfur is preferably incorporated into the catalyst surface via sulfur-metal bonds. By means of the process according to the invention, the sulfur in the form of sulfur compounds immobilized by the reaction on the catalyst surface can be reconverted to volatile sulfur compounds which can be removed from the catalyst surface.

The non-oxidative regeneration is preferably carried out at elevated temperature, which is understood to mean treatment at a temperature above ambient temperature.

The non-oxidative regeneration is carried out particularly at a temperature of up to 600° C. In a preferred embodiment, the regeneration is carried out at a temperature of 200° C. to 500° C., in a particularly preferred embodiment at a temperature of 300° C. to 450° C.

The regeneration stream in the non-oxidative process step comprises hydrogen halide, preferably hydrogen chloride, wherein the hydrogen halide content is preferably 0.1 to 100% by volume. In a preferred embodiment, the hydrogen halide content of the regeneration stream is 1 to 30% by volume, particularly preferably 5 to 25% by volume. Further constituents of the regeneration stream may be in particular inert gases such as nitrogen or argon. The elemental hydrogen halide can also be replaced by substances or substance mixtures which release hydrogen halide, i.e. in particular hydrogen chloride, hydrogen fluoride, hydrogen bromide or hydrogen iodide, under the regeneration conditions described, or substances or substance mixtures of which the hydrogen and halogen functions achieve a comparable effect to elemental hydrogen halide under the regeneration conditions described. Phosgene may be mentioned here by way of example.

Non-oxidative conditions or non-oxidative regeneration is understood here to mean treatment of the catalyst in a regeneration gas stream which has particularly as few oxidizing components as possible.

The non-oxidative regeneration gas stream particularly comprises only a low fraction of oxygen, i.e. in particular at most 1% by volume, preferably at most 0.2% by volume, particularly preferably at most 0.1% by volume of oxygen.

In a particularly preferred embodiment, the regeneration stream does not comprise any oxygen.

According to experience, the usable gases detailed for the regeneration for technical reasons often comprise impurities (at an order of magnitude<1000 ppm), e.g. chlorine and water, the presence of which is not disadvantageous for the regeneration. Interfering impurities (e.g. sulfur in the form of sulfur compounds or oxygen) can be expediently removed from the regeneration gas beforehand.

The regeneration time of the first stage is preferably 0.5 hours to 100 hours. At an unnecessarily long regeneration period, the ruthenium content of the catalyst may be unintentionally reduced by the formation of volatile ruthenium compounds. The optimal regeneration period depends in particular on the sulfur loading, on the regeneration temperature and on the hydrogen chloride content in the regeneration stream. The regeneration can be carried out in one step or in several intervals. The regeneration is preferably effected at intervals, wherein the sulfur content and/or the activity of the catalyst are determined between the time intervals.

The oxidative regeneration or oxidative post-treatment is preferably carried out at reduced temperature, which is understood to mean treatment at a temperature below the temperature of the non-oxidative regeneration of the first process step.

The oxidative post-treatment is carried out independently of the first stage, particularly at a temperature up to 600° C. In a preferred embodiment, the oxidative post-treatment is carried out at a temperature of 200° C. to 500° C., in a particularly preferred embodiment at a temperature of 200° C. to 400° C.

In the context of the invention, oxidative post-treatment is understood to mean post-treatment of the catalyst in a regeneration stream comprising oxidizing gases (e.g. oxygen, steam, $N_2O$)

The gas stream of the first process step of the oxidative post-treatment comprises steam, wherein the steam content is preferably 0.1 to 100% by volume. In a preferred embodiment, the steam content is 20 to 80% by volume, particularly preferably 40 to 60% by volume. Further constituents of the gas stream may be in particular inert gases such as nitrogen or argon. Steam may also be replaced by substances or substance mixtures which achieve a comparable effect to steam under the conditions described. Nitrous oxide ($N_2O$) is mentioned here by way of example.

The gas stream of the first process step of the oxidative post-treatment comprises only a low fraction of oxygen in the form of $O_2$, i.e. particularly at most 1% by volume, preferably at most 0.2% by volume, particularly preferably at most 0.1% by volume oxygen. In a particularly preferred embodiment, the gas stream of the first process step of the oxidative post-treatment does not comprise any oxygen.

The duration of the first process step of the oxidative post-treatment is preferably 0.1 hours to 100 hours. At an unnecessarily long first process step, the ruthenium content of the catalyst may be unintentionally reduced by leaching. The optimal duration of the first process step of the post-treatment depends in particular on the sulfur loading, the amount of sulfur removed from the catalyst, the total amount of catalyst and the proportion of chlorinated or oxychlorinated ruthenium compounds or surface-chlorinated or oxychlorinated ruthenium compounds. The first process step of the post-treatment can be carried out either in one step or in several intervals.

The gas stream of the second process step of the oxidative post-treatment comprises oxygen ($O_2$), wherein the oxygen content is preferably 0.1 to 100% by volume. In a preferred embodiment, the oxygen content is 20 to 80% by volume, particularly preferably 40 to 60% by volume. During the second process step, the oxygen content is preferably increased continuously or sequentially, particularly preferably sequentially. In the case of sequential increase, this increase of the oxygen proportion can be effected in any number of steps, preferably in 2 to 10 steps, particularly preferably in 2 to 5 steps. Further constituents of the gas stream may be in particular inert gases such as nitrogen or argon.

The gas stream of the second process step of the post-treatment comprises only a low fraction of chlorine in the form of HCl or $Cl_2$, i.e. particularly at most 1% by volume, preferably at most 0.2% by volume, particularly preferably at most 0.1% by volume of chlorine. In a particularly preferred embodiment, the gas stream of the second process step of the post-treatment comprises neither HCl nor $Cl_2$. The identical conditions (HCl and $Cl_2$ content) apply in principle preferably also to the composition of the gas stream comprising steam in the first stage of the oxidative post-treatment.

The duration of the second process step of the post-treatment is preferably 0.1 hours to 100 hours. The optimal duration of the second process step of the post-treatment depends in particular on the total amount of catalyst and the proportion of chlorinated or oxychlorinated ruthenium compounds or surface-chlorinated or oxychlorinated ruthenium compounds. The second process step of the post-treatment can be carried out either in one step or in several intervals.

According to experience, in principle the usable gases detailed for the post-treatment for technical reasons often comprise impurities (at an order of magnitude<1000 ppm), e.g. nitrogen and carbon dioxide, the presence of which is not disadvantageous for the regeneration. Interfering impurities (e.g. sulfur in the form of sulfur compounds) can be expediently removed from the regeneration gas beforehand.

In a particularly preferred embodiment, the catalyst remains during the regeneration in the reactor in which the catalytic target reaction (particularly the catalytic gas phase oxidation of HCl) also is or was carried out. In a possible preferred embodiment of this variant, the regeneration is conducted in countercurrent to the direction of flow of gas of the reaction gases of the specified target reaction in order to avoid entrainment of discharged sulfur components on poorly or non-poisoned catalyst layers.

A preferred use is the regeneration of catalysts comprising ruthenium or ruthenium compounds for the catalyzed gas phase oxidation of hydrogen chloride with oxygen since in this case the required apparatus environment for handling hydrogen chloride is already present and the catalyst must be resistant to a hydrogen chloride atmosphere during the reaction.

A preferred use is the regeneration of catalysts, the active components of which consist mainly of supported ruthenium or ruthenium compounds. A particularly preferred use is the regeneration of catalysts comprising ruthenium or ruthenium compounds, of which the support has mainly a rutile structure. A further particularly preferred use is the regeneration of catalysts comprising ruthenium or ruthenium compounds, of which the support comprises titanium dioxide, aluminum oxide, zirconium oxide or tin dioxide or mixtures thereof. A preferred use is catalyst regeneration in connection with a process consisting of two or more coupled steps for isocyanate production, including catalyzed hydrogen chloride oxidation, the individual process steps of which are known in principle from EP 1867631 A1 for example.

The novel process is preferably combined with the catalytic gas phase oxidation process known as the Deacon process. In this process, hydrogen chloride is oxidized with oxygen in an exothermic equilibrium reaction to afford chlorine while generating steam. The reaction temperature is typically 150 to 500° C. and the standard reaction pressure is 1 to 25 bar. Since the reaction is an equilibrium reaction, it is appropriate to work at minimum temperatures at which the catalyst still has a sufficient activity. It is also appropriate to use oxygen in superstoichiometric amounts relative to hydrogen chloride. A two- to four-fold oxygen excess, for example, is typical. Since there is no risk of any selectivity losses, it can be economically advantageous to operate at relatively high pressure, and accordingly with a longer residence time than at standard pressure. Particular preference is given to a novel process in which, independently of each other, prior to or after the regeneration of the catalyst, the gas phase oxidation of hydrogen chloride with oxygen is operated at an HCl to oxygen volume stream ratio of at least 1:1, preferably of at least 1.5:1, particularly preferably of at least 2:1.

The catalytic hydrogen chloride oxidation may be conducted adiabatically or preferably isothermally or virtually isothermally, batchwise but preferably continuously, as a fluidized bed or fixed bed process, preferably as a fixed bed process, particularly preferably in tube bundle reactors over heterogeneous catalysts at a reactor temperature of 180 to 500° C., preferably 200 to 400° C., more preferably 220 to 350° C., and a pressure of 1 to 25 bar (1000 to 25 000 hPa), preferably 1.2 to 20 bar, more preferably 1.5 to 17 bar and especially 2.0 to 15 bar.

Typical reaction apparatuses in which the catalytic hydrogen chloride oxidation is performed are fixed bed or fluidized bed reactors. The catalytic hydrogen chloride oxidation can preferably also be performed in a plurality of stages.

The conversion of hydrogen chloride in a single pass may preferably be limited to 15% to 90%, preferably 40% to 90%, particularly preferably 50% to 90%. Unconverted hydrogen chloride may, after separation, be partly or fully recycled into the catalytic hydrogen chloride oxidation.

In the adiabatic or virtually adiabatic procedure, also a plurality of, i.e. 2 to 10, preferably 2 to 6, particularly preferably 2 to 5, especially 2 to 3 reactors connected in series may be used with additional intermediate cooling. The hydrogen chloride may be added either in its entirety upstream of the first reactor together with the oxygen or such that it is distributed over the various reactors. This serial connection of individual reactors can also be combined in one apparatus. In this case, a preferred purification process for the catalyst can be achieved particularly easily as an in situ process by taking a reactor of the reactor cascade of the Deacon process and subjecting the catalyst contained therein to the regeneration according to the invention.

A further preferred embodiment of an apparatus suitable for the Deacon process consists in using a structured catalyst filling in which the catalyst activity increases in the direction of flow. Such a structuring of the catalyst filling can be accomplished through varying impregnation of the catalyst supports with active mass or through varying dilution of the catalyst with an inert material. Employable inert materials are for example rings, cylinders or spheres of titanium dioxide, zirconium dioxide or mixtures thereof, aluminum oxide, steatite, ceramic, glass, graphite or stainless steel. In the case of the preferred use of shaped catalyst bodies, the inert material should preferably have similar external dimensions.

Suitable preferred catalysts for the Deacon process comprise ruthenium oxides, ruthenium chlorides or other ruthenium compounds. Suitable support materials are, for example, silicon dioxide, graphite, titanium dioxide with rutile or anatase structure, zirconium dioxide, aluminum oxide or mixtures thereof, preferably titanium dioxide, zirconium oxide, aluminum oxide or mixtures thereof, more preferably 7- or 6-aluminum oxide or mixtures thereof. Suitable catalysts may be obtained, for example, by applying ruthenium(III) chloride to the support and subsequent drying or drying and calcination. Suitable catalysts may contain in addition to a ruthenium compound, also compounds of other noble metals, for example gold, palladium, platinum, osmium, iridium, silver, copper or rhenium. Suitable catalysts may also contain chromium(III) oxide.

For doping of the catalysts, suitable promoters are alkali metals such as lithium, sodium, potassium, rubidium and cesium, preferably lithium, sodium and potassium, more preferably potassium, alkaline earth metals such as magnesium, calcium, strontium and barium, preferably magnesium and calcium, more preferably magnesium, rare earth metals such as scandium, yttrium, lanthanum, cerium, praseodymium and neodymium, preferably scandium, yttrium, lanthanum and cerium, more preferably lanthanum and cerium, or mixtures thereof.

The forming of the catalyst can be carried out after or preferably before impregnating the support material. Suitable shaped catalyst bodies include shaped bodies with any desired forms, preference being given to tablets, rings, cylinders, stars, wagonwheels or spheres, particular preference being given to rings, cylinders or star extrudates, as the form. The shaped bodies may then be dried at a temperature of 100 to 400° C., preferably 100 to 300° C., for example under an atmosphere of nitrogen, argon or air, and may be optionally calcined. The shaped bodies are preferably initially dried at 100 to 150° C. and subsequently calcined at 200 to 400° C.

A further possible application is the regeneration of a catalyst which in a sacrificial bed is upstream of the actual catalyst for the main reaction, particularly a Deacon reaction, and protects the latter catalyst particularly against sulfur compounds but also against other catalyst poisons.

The following examples illustrate the present invention without limiting it:

EXAMPLES

Section 1: Preparation of the Catalysts
To be able to illustrate the invention, pelleted supported ruthenium catalysts were prepared supported on $SnO_2$ or $TiO_2$.

Example 1a 200 g of $SnO_2$ pellets (spherical, diameter approximately 1.9 mm, Alfa Aesar) were impregnated with a solution of 9.99 g of ruthenium chloride n-hydrate in 33.96 ml of $H_2O$ and then mixed thoroughly for 1 h. The moist solid was then dried at 60° C. in a muffle furnace (air) for 4 h and calcined therein at 250° C. for 16 h.

Example 1b 100 g of $TiO_2$ pellets (cylindrical, diameter approximately 2 mm, length 2 to 10 mm, Saint-Gobain) were impregnated with a solution of ruthenium chloride n-hydrate in $H_2O$ such that the theoretical Ru content was 3% by weight. The moist pellets thus obtained were dried overnight at 60° C. and in the dry state introduced under nitrogen flushing into a solution of NaOH and 25% hydrazine hydrate solution in water and left to stand for 1 h. Excess water was then evaporated off. The moist pellets were dried at 60° C. for 2 h and then washed with 4×300 g of water. The moist pellets thus obtained were dried at 120° C. in the muffle furnace (air) for 20 min and calcined therein at 350° C. for 3 h.

Section 2: Poisoning of the Catalysts with Sulfur Componds
In order to be able to illustrate the invention, a portion of the prepared catalyst pellets were specifically poisoned with sulfur in the form of the sulfur compound $SO_2$. The designation of the catalysts after poisoning and the most important features of the poisoning runs can also be seen in Table 2.

Example 2a 0.5 g of the catalyst pellets prepared according to example 1a were initially charged in a quartz reaction tube (diameter 10 mm) and perfused at 320° C. with a gas mixture 1 (consisting of 2 L/h hydrogen chloride, 1 L/h oxygen, 2 L/h nitrogen and 40 ppm $SO_2$) for 24 hours.

Example 2b 0.5 g of the catalyst pellets prepared according to example 1b were initially charged in a quartz reaction tube (diameter 10 mm) and perfused at 320° C. with a gas mixture 1 (consisting of 2 L/h hydrogen chloride, 1 L/h oxygen, 2 L/h nitrogen and 40 ppm $SO_2$) for 24 hours.

Example 2c 19.5 g of a supported ruthenium catalyst 1c ($TiO_2$ support) were initially charged in a nickel reaction tube (diameter 16 mm) and perfused for more than 20 000 h at variable temperatures with a gas mixture (consisting of 1 mol/h HCl, 2 mol/h $O_2$, 2 mol/h $N_2$) and over this period loaded with an unknown composition and amount of sulfur components.

TABLE 1

Designation of the catalysts poisoned with sulfur and the most important features of the poisoning course.

| Designation of the catalyst pellets | | Poisoning conditions | | |
|---|---|---|---|---|
| after poisoning | prior to poisoning | Component | Duration [h] | $SO_2$ [ppm] |
| 2a | 1a | $SO_2$ | 24 | 40 |
| 2b | 1b | $SO_2$ | 24 | 40 |
| 2c | 1c | $SO_2$ | 24 | 40 |

Example 3: Use of Regeneration Conditions of WO 2009 118 095 A3 (Regeneration Method 1) on Supported Ruthenium Catalysts ($SnO_2$ Support and $TiO_2$ Support)—Comparative Example 0.5 g of the non-poisoned catalyst pellets with the designation 1a and in each case 0.5 g of the catalyst pellets poisoned according to example 2 with the designation 2a, 2b and 2c were initially charged in a quartz reaction tube (diameter 10 mm) and, after heating in nitrogen (non-poisoned), were firstly subjected to an activity assay and for this purpose a gas mixture 2 (consisting of 2 L/h HCl, 8 h $O_2$ and 10 L/h $N_2$) were passed through at 320° C. for 18 hours. These samples were then subjected to a single regeneration. Gas mixture 4 (consisting of 2 L/h HCl and 8 L/h $N_2$) was passed over these batches at 380° C. for 16 h. Subsequently, the temperature was lowered under regeneration conditions to 320° C. and gas mixture 3 (consisting of 2 L/h HCl, 8 L/h 02 and 10 L/h $N_2$) was passed over the batches (1aR1, 2aR, 2bR1, 2cR1) for 4 h and the activity determined.

Example 4: Use of Regeneration Conditions of WO 2010 076 296 A1 (Regeneration Method 2) on Supported Ruthenium Catalysts ($SnO_2$ Support and $TiO_2$ Support)—Comparative Example 0.5 g of the non-poisoned catalyst pellets with the designation 1a and in each case 0.5 g of the catalyst pellets poisoned according to example 2 with the designation 2a, 2b and 2c were initially charged in a quartz reaction tube (diameter 10 mm) and, after heating in nitrogen (non-poisoned), were firstly subjected to an activity assay and for this purpose a gas mixture 5 (consisting of 2 L/h HCl, 1 L/h $O_2$) were passed through at 320° C. for 18 hours. These samples were then subjected to a single regeneration. Gas mixture 6 (consisting of 1.54 L/h HCl and 1.54 L/h $N_2$) was passed over these batches at 400° C. for 12 h. Subsequently, gas mixture 7 (consisting of 3.08 L/h synthetic air: 21% $O_2$, 79% $N_2$) was passed over these batches and the latter also calcined at 400° C. for 0.5 h. Subsequently, the temperature in gas mixture 7 was lowered to 320° C. and gas mixture 5 (consisting of 2 L/h HCl, 11 Uh 02) was passed over the batches (1aR2, 2aR2, 2bR2, 2cR2) for 24 h and the activity determined.

Example 5: Use of the Novel Regeneration Conditions (Regeneration Method 3) on Supported Ruthenium Catalysts ($SnO_2$ Support and $TiO_2$ Support)

0.5 g of the non-poisoned catalyst pellets with the designation 1a and in each case 0.5 g of the catalyst pellets poisoned according to example 2 with the designation 2a, 2b, 2c were initially charged in a quartz reaction tube (diameter 10 mm) and, after heating in nitrogen (non-poisoned), were firstly subjected to an activity assay and for this purpose a gas mixture 8 (consisting of 2 L/h HCl, 1 L/h $O_2$ and 2 L/h $N_2$) were passed through at 320° C. for 18 hours. These samples were then subjected to a single regeneration. Gas mixture 9 (consisting of 2 L/h HCl and 6.67 L/h $N_2$) was passed over these batches at 380° C. for 16 h. Subsequently, the temperature was lowered to 260° C. under regeneration conditions and gas mixture 10 (consisting of steam) was passed through for 4 h. Subsequently, the following consecutive oxidative treatment is carried out at 260° C.: for 0.5 h gas mixture 11 (consisting of 0.33 L/h $O_2$ and 2 L/h $N_2$), for 0.5 h gas mixture 12 (consisting of 0.66 L/h $O_2$ and 2 L/h $N_2$), for 1 h gas mixture 13 (consisting of 1.33 L/h $O_2$ and 2 L/h $N_2$), and for 2 h gas mixture 14 (consisting of 2 L/h $O_2$ and 2 L/h $N_2$). Subsequently, the temperature in gas mixture 8 was increased to 320° C. and gas mixture 8 (consisting of 2 L/h HCl, 1 L/h $O_2$ and 2 L/h $N_2$) was passed over the batches (1aR3, 2aR3, 2bR3, 2cR3) for 24 h and the activity determined.

Example 6: Use of the Novel Regeneration Conditions (Regeneration Method 3) on Supported Ruthenium Catalysts ($SnO_2$ Support and $TiO_2$ Support)

0.5 g of catalyst pellets poisoned according to example 2 with the designation 2a and 2b were initially charged in a quartz reaction tube (diameter 10 mm) and subjected to a single regeneration. Gas mixture 9 (consisting of 2 L/h HCl and 6.67 L/h $N_2$) was passed over these batches at 380° C. for 16 h. Subsequently, the temperature was lowered to 260° C. under regeneration conditions and gas mixture 10 (consisting of steam) was passed through for 4 h. Subsequently, the following consecutive oxidative treatment was carried out at 260° C.: for 0.5 h gas mixture 11 (consisting of 0.33 L/h $O_2$ and 2 L/h $N_2$), for 0.5 h gas mixture 12 (consisting of 0.66 L/h $O_2$ and 2 L/h $N_2$), for 1 h gas mixture 13 (consisting of 1.33 L/h $O_2$ and 2 L/h $N_2$), and for 2 h gas mixture 14 (consisting of 2 L/h $O_2$ and 2 L/h $N_2$). Subsequently, the temperature in gas mixture 8 was increased to 320° C. and gas mixture 8 (consisting of 2 L/h HCl, 1 L/h $O_2$ and 2 L/h $N_2$) was passed over the batches (1aR3, 2aR3, 2bR3) for 24 h and the activity determined.

Example 7: Use of Regeneration Conditions Based on WO 2009 118 095 A3 (Regeneration Method 3) on Supported Ruthenium Catalysts ($SnO_2$ Support and $TiO_2$ Support)—Comparative Example 0.5 g of catalyst pellets poisoned according to example 2 with the designation 2a and 2b were initially charged in a quartz reaction tube (diameter 10 mm) and subjected to a single regeneration. Gas mixture 9 (consisting of 2 L/h HCl and 6.67 L/h $N_2$) was passed over these batches at 380° C. for 16 h. Subsequently, the temperature in gas mixture 8 was lowered to 320° C. and gas mixture 8 (consisting of 2 h HCl, 1 L/h $O_2$ and 2 L/h $N_2$) was passed over the batches (2aR4, 2bR4) for 24 h and the activity determined (see Table 2).

TABLE 2

| Batch | Relative activity prior to regeneration* | Relative activity after regeneration | HCl [L/h] | $O_2$ [L/h] | $N_2$ [L/h] | S content prior to regeneration [ppm] | S content after regeneration [ppm] | Regeneration method |
|---|---|---|---|---|---|---|---|---|
| 1aR1 | 1 | 1.07# | 2 | 8 | 10 | — | — | 1 |
| 2aR1 | 1 | 1.04# | 2 | 8 | 10 | — | — | 1 |
| 2bR1 | 1 | 1.16# | 2 | 8 | 10 | — | — | 1 |
| 2cR1 | 1 | 1.57# | 2 | 8 | 10 | — | — | 1 |
| 1aR2 | 0.48 | 0.81# | 2 | 1 | 0 | — | — | 2 |
| 2aR2 | 0.44 | 0.96# | 2 | 1 | 0 | — | — | 2 |
| 2bR2 | 0.62 | 0.89# | 2 | 1 | 0 | — | — | 2 |
| 2cR2 | 0.66 | 0.90# | 2 | 1 | 0 | — | — | 2 |
| 1aR3 | 0.39 | 1.15# | 2 | 1 | 2 | — | — | 3 |
| 2aR3 | 0.46 | 1.12# | 2 | 1 | 2 | — | — | 3 |
| 2bR3 | 0.61 | 0.89# | 2 | 1 | 2 | — | — | 3 |
| 2cR3 | 0.67 | 1.11# | 2 | 1 | 2 | — | — | 3 |

TABLE 2-continued

| Batch | Relative activity prior to regeneration* | Relative activity after regeneration | HCl [L/h] | O$_2$ [L/h] | N$_2$ [L/h] | S content prior to regeneration [ppm] | S content after regeneration [ppm] | Regeneration method |
|---|---|---|---|---|---|---|---|---|
| 2aR4 | — | 0.99+ | 2 | 1 | 2 | 6600 | 5300 | 3 |
| 2bR4 | — | 0.89+ | 2 | 1 | 2 | 820 | 530 | 3 |
| 2aR5 | — | 0.39+ | 2 | 1 | 2 | 6600 | 6000 | 1 |
| 2bR5 | — | 0.39+ | 2 | 1 | 2 | 820 | 600 | 1 |

*Based on sample 1aR1 for all 1a samples, based on sample 2aR1 for all 2a samples, based on sample 2bR1 for all 2b samples, based on sample 2cR1 for all 2c samples.
Based on the activity of the corresponding sample prior to regeneration
+Based on the activity of the corresponding sample prior to poisoning

CONCLUSIONS

Example 3

Regeneration method 1 at a low HCl:O$_2$ ratio (1:4) in the freshly prepared and poisoned SnO$_2$-supported catalyst (2aR1) results in a slight increase in the activity (+4%) in relation to the poisoned catalyst. In the freshly prepared and poisoned TiO$_2$-supported catalyst (2aR1), regeneration method 1 results in a greater increase in the activity (+16%) in relation to the poisoned catalyst. In the case of the poisoned TiO$_2$-supported catalyst (2cR1) operated for a long time in the HCl oxidation, regeneration method 1 results in a sharp increase in the activity (+57%) in relation to the poisoned catalyst. Also in the case of the freshly prepared and non-poisoned SnO$_2$-supported catalyst (1aR1) the activity increases slightly (+7%) in relation to the starting activity according to regeneration method 1.

Therefore, regeneration method 1 has proven to be a suitable method to regenerate supported ruthenium catalysts, which operate at a low HCl:O$_2$ ratio (1:4) and have been restarted.

Example 4

In the case of the experiments with regeneration method 2, it should be noted that the starting activities are much lower owing to the higher HCl to O$_2$ ratio (2:1) compared to the low HCl:O$_2$ ratio (1:4) in regeneration method 1. This behavior of supported ruthenium catalysts at a higher HCl to O$_2$ ratio is known.

In all supported ruthenium catalysts investigated, regeneration method 2 leads to a reduction in activity (−4 to −19%) in relation to the poisoned catalyst and the starting activity in the non-poisoned catalyst. Therefore, regeneration method 2 has proven not to be a suitable method to regenerate supported ruthenium catalysts.

Example 5

Also in the case of the experiments with regeneration method 3, it should be noted that the starting activities are much lower owing to the higher HCl to O$_2$ ratio (2:1) compared to the low HCl to O$_2$ ratio (1:4) in regeneration method 1.

However, in the freshly prepared and poisoned SnO$_2$-supported catalyst (2aR1), regeneration method 3 results in a greater increase in the activity (+12%) in relation to the poisoned catalyst. In the freshly prepared and poisoned TiO$_2$-supported catalyst (2aR1), regeneration method 3 results in a reduction in the activity (−11%) in relation to the poisoned catalyst. However, in the case of the poisoned TiO$_2$-supported catalyst (2cR1) operated for a long time in the HCl oxidation, regeneration method 3 results in a sharp increase in activity (+11%) in relation to the poisoned catalyst. Also in the case of the freshly prepared and non-poisoned SnO$_2$-supported catalyst (1aR1) the activity increases sharply (+15%) in relation to the starting activity according to regeneration method 3.

Therefore, regeneration method 3 has proven to be a suitable method to regenerate supported ruthenium catalysts, which operate at a high HCl:O$_2$ ratio (2:1) and have been restarted.

Example 6 and 7

In these two examples, regeneration method 1 and regeneration method 3 were compared at a high HCl to O$_2$ ratio (2:1) in relation to sulfur removal and activity after regeneration.

Firstly, it appears that the SnO$_2$-supported catalyst has absorbed far more sulfur by poisoning (6600 ppm) than the TiO$_2$-supported catalyst (820 ppm). After regeneration method 1, the sulfur fraction has been reduced in the SnO$_2$-supported catalyst by 600 ppm and in the TiO$_2$-supported catalyst by 220 ppm. After regeneration method 3, the sulfur fraction has been reduced in the SnO$_2$-supported catalyst by 1300 ppm and in the TiO$_2$-supported catalyst by 290 ppm. Therefore, both regeneration methods are suitable to remove sulfur from supported ruthenium catalysts but regeneration method 3 removes a greater proportion of sulfur from the catalysts.

In the SnO$_2$-supported catalyst, regeneration method 3 results in an activity of 99% based on the starting activity in the non-poisoned catalyst. In the TiO$_2$-supported catalyst, regeneration method 3 results in an activity of 89% based on the starting activity in the non-poisoned catalyst. On the other hand, in the SnO$_2$-supported catalyst, regeneration method 1 results in an activity of only 39% based on the starting activity in the non-poisoned catalyst. In the TiO$_2$-supported catalyst, regeneration method 1 also results in an activity of only 39% based on the starting activity in the non-poisoned catalyst.

Thus, it has been shown that regeneration method 1 is suitable for removing sulfur from supported ruthenium catalysts and to regenerate the catalysts at a low HCl to O$_2$ ratio, but this is no longer the case at a high HCl to O$_2$ ratio.

On the other hand, it has been shown that regeneration method 3 is suitable for removing sulfur from supported ruthenium catalysts and to regenerate the catalysts both at a low and also at a high HCl to O$_2$ ratio.

The invention claimed is:
1. A process for regenerating a catalyst comprising ruthenium or ruthenium compounds, which has been poisoned by sulfur in the form of sulfur compounds, comprising subject- ing the catalyst, optionally at elevated temperature, to treatment with a hydrogen halide, under non-oxidative conditions and additionally, optionally at reduced temperature, to an at least two-stage oxidative post-treatment, wherein in a first process step the catalyst is partially oxidized by treatment with a gas stream comprising steam having a steam content of 0.1 to 100% by volume, and in a second process step the catalyst is further oxidized, by treatment with a gas stream comprising oxygen, the oxygen concentration of which is increased continuously or sequentially.

2. The process as claimed in claim 1, wherein the non-oxidative regeneration is carried out at a temperature up to 600° C.

3. The process as claimed in claim 1, wherein the regeneration is carried out at a pressure of up to 20 bar.

4. The process as claimed in claim 1, wherein the non-oxidative regeneration is carried out at a hydrogen halide content of 0.1 to 100% by volume.

5. The process as claimed in claim 1, wherein the oxidative post-treatment is carried out at a temperature up to 600° C.

6. The process as claimed in claim 1, wherein the oxidative post-treatment is carried out at a pressure of up to 20 bar.

7. The process as claimed in claim 1, wherein the first process step of the oxidative post-treatment is carried out at a steam content of 20 to 80 100% by volume.

8. The process as claimed in claim 1, wherein the second process step of the oxidative post-treatment is carried out at an oxygen content in the range of 0.1 to 100% by volume.

9. The process as claimed in claim 1, wherein the catalyst comprising ruthenium or ruthenium compounds is a catalyst based on ruthenium halides.

10. The process as claimed in claim 1, wherein the non-oxidative regeneration of the first stage is carried out over a time period of 0.5 hours to 100 hours.

11. The process as claimed in claim 1, wherein the oxidative post-treatment steps are each carried out independently of one another over a time period of 0.1 hours to 100 hours.

12. The process as claimed in claim 1, wherein the regeneration and the oxidative post-treatment are carried out in the same reaction space, in which the catalyst is used for carrying out the reaction which is catalyzed by the catalyst.

13. The process as claimed in claim 12, wherein the regeneration gas stream and the oxidative post-treatment streams are passed over the catalyst in countercurrent to the direction of flow of the reaction components of the catalyzed reaction in the reaction space.

14. The process as claimed in claim 1, wherein the catalyst is a catalyst for the gas phase oxidation of hydrogen chloride with oxygen.

15. The process as claimed in claim 1, wherein after the regeneration, the gas phase oxidation of hydrogen chloride with oxygen is restarted with a maximum HCl to oxygen ratio of 1:1.

16. The process as claimed in claim 1, wherein prior to the regeneration, the gas phase oxidation of hydrogen chloride with oxygen was operated again at a maximum HCl to oxygen ratio of at least 1:1.

17. The process as claimed in claim 1, wherein the regeneration and the oxidative post-treatment are carried out at intervals, wherein between the time intervals the sulfur content and/or the activity of the catalyst is determined.

18. The process as claimed in claim 1, wherein the sulfur compounds are one or more compounds selected from the series: $H_2SO_4$, $H_2SO_3$, $SO_3$, COS, $H_2S$, salts of $H_2SO_4$ and $H_2SO_3$.

19. The process for the catalyzed gas phase oxidation of hydrogen chloride with oxygen using a catalyst based on ruthenium or ruthenium compounds, wherein the catalyst is subjected to a regeneration process as claimed in claim 1 from a predefined value for loss of its catalytic activity.

* * * * *